United States Patent
Matsuoka et al.

(10) Patent No.: US 9,676,375 B2
(45) Date of Patent: Jun. 13, 2017

(54) PEDAL STROKE SENSOR ATTACHMENT STRUCTURE OF AUTOMOTIVE VEHICLE

(71) Applicant: MAZDA MOTOR CORPORATION, Hiroshima (JP)

(72) Inventors: Toshihiro Matsuoka, Higashihiroshima (JP); Kota Okamura, Yokohama (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 49 days.

(21) Appl. No.: 14/790,459

(22) Filed: Jul. 2, 2015

(65) Prior Publication Data

US 2016/0059832 A1 Mar. 3, 2016

(30) Foreign Application Priority Data

Aug. 28, 2014 (JP) .................................. 2014-173494
Aug. 28, 2014 (JP) .................................. 2014-173495

(51) Int. Cl.
*G05G 1/30* (2008.04)
*B60T 7/04* (2006.01)
*G05G 1/32* (2008.04)

(52) U.S. Cl.
CPC ................ *B60T 7/042* (2013.01); *G05G 1/30* (2013.01); *G05G 1/32* (2013.01)

(58) Field of Classification Search
CPC ........... B60T 7/042; B60T 7/065; G05G 1/30; G05G 1/32; G05G 1/323; G05G 1/327
See application file for complete search history.

(56) References Cited

U.S. PATENT DOCUMENTS

| 7,395,734 | B2 * | 7/2008 | Fujiwara | ................. | B60T 7/042 |
| | | | | | 74/514 |
| 8,701,521 | B2 * | 4/2014 | Yoshida | ................. | B60R 21/09 |
| | | | | | 74/513 |
| 2010/0313699 | A1 | 12/2010 | Yoshida et al. | | |
| 2014/0251067 | A1 * | 9/2014 | Fukui | ....................... | B60T 7/06 |
| | | | | | 74/512 |
| 2016/0259361 | A1 * | 9/2016 | Fukatsu | ................. | B60T 7/042 |

FOREIGN PATENT DOCUMENTS

| JP | H09-164925 A | 6/1997 |
| JP | 2013-032115 A | 2/2013 |

* cited by examiner

*Primary Examiner* — Adam D Rogers
(74) *Attorney, Agent, or Firm* — Studebaker & Brackett PC

(57) ABSTRACT

A stroke sensor is arranged to be offset downward relative to a pedal rotational axis, and link arms which interlock the stroke sensor with a pedal are provided. The link arm includes an engaged portion (groove), with which an engaging portion provided on the side of the pedal is slidably engaged. Herein, the engaged portion (groove) is configured such that the engaging portion is slid vertically along the engaged portion (groove) by a specified length that is long enough to allow falling-off of the pedal.

11 Claims, 13 Drawing Sheets

PEDAL STROKE SENSOR ATTACHMENT STRUCTURE OF AUTOMOTIVE VEHICLE

BACKGROUND OF THE INVENTION

The present invention relates to a pedal stroke sensor attachment structure of an automotive vehicle, and specifically, relates to the pedal stroke sensor attachment structure of the automotive vehicle which comprises a falling-off mechanism configured to make a pedal rotational axis fall off a support portion of the pedal rotational axis when a collision load to make a pedal retreat toward a passenger side is applied to a vehicle body.

In general, an automotive vehicle has a pedal device, which is provided at a vehicle body positioned in front of a driver's seat, such as a dash panel, and comprises a bracket attached to the vehicle body and a hanging-type pedal supported at the bracket via a pedal rotational axis. In recent years, the vehicle, in which a falling-off mechanism to make the pedal fall off the bracket when the dash panel is moved in a vehicle collision and the bracket retreats is provided to protect passengers against the vehicle collision, is known. Further, there is a case in which a pedal stroke sensor comprising a detecting element to detect a swinging stroke of the pedal is provided at the pedal device.

Conventionally, in a case in which both the falling-off mechanism and the stroke sensor are provided at the pedal device, the stroke sensor is offset-arranged above or forward relative to the pedal rotational axis so as to avoid any interference with the pedal which falls off, and the pedal rotational axis and the stroke sensor are connected via a link mechanism, such as a link arm. However, it is necessary to provide an arrangement space of the stroke sensor. Further, there is a structure in which the stroke sensor is provided coaxially with the pedal rotational axis in place of the offset-arrangement of the stroke sensor relative to the pedal rotational axis.

Herein, in the former where the link mechanism is used, there is a case in which a stroke of the pedal and a stroke of the sensor do not synchronize. That is, there is a problem in that there exits a difference between a pedal-stroke angle and a sensor angle, so that the stroke sensor and a control program which are designed for being coaxial may not be used simply. Thus, there is a room for improvement.

Meanwhile, in the latter where the stroke sensor is arranged coaxially with the pedal rotational axis, there is a concern that because an attachment portion where the pedal bracket pivotally supporting the pedal is attached to the vehicle body via an attaching member, such as a bolt and nut, and the stroke sensor overlap in a vehicle longitudinal direction, it may become difficult to attach the stroke sensor. Therefore, it is required to design such that an attachment working space of the vehicle-body attachment portion does not interfere with the pedal rotational axis, considering an easy insertion of working tools into the vehicle-body attachment portion of the pedal. Consequently, there is a problem in that the flexibility of design may deteriorate and arranging the stroke sensor may become difficult in a case in which a brake pedal and an accelerator pedal are provided adjacently in a vehicle width direction.

In either case, the design for both ensuring the attachment working space for the vehicle-body attachment portion and avoiding the interference of the pedal rotational axis with the stroke sensor in a pedal falling-off state is required, considering the easy insertion of working tools into the vehicle-body attachment portion of the pedal.

In the meantime, Japanese Patent Laid-Open Publication No. 2013-32115 discloses a structure provided with a falling-off mechanism (falling-off means) to make the pedal fall off the pedal bracket in the vehicle collision, in which the stroke sensor is arranged coaxially with the pedal rotational axis.

This conventional structure disclosed in the above-described Japanese patent document has a problem in that an arrangement position of the stroke sensor may be limited, the assemblability of the pedal and the stroke sensor may be bad, and the flexibility of design may be improperly low.

Further, US Patent Application Publication No. 2010/0313699 A1 discloses a structure in which the stroke sensor is arranged to be offset upward relative to the pedal rotational axis, and a pedal rotation and an input shaft of the strike sensor are connected via a link arm, a link rod, and a sensor arm.

This conventional structure disclosed in the above-described US patent document has a problem in that the serviceability of the stroke sensor may be bad because the stroke sensor is positioned inside the pedal bracket having a U shape in a plan view, and also the layout performance of the stroke sensor may be bad because the stroke sensor is arranged at a deep position located upward and forward relative to the pedal rotational axis. Further, there is a problem in that a sensor swing angle relative to a pedal swing angle is so nonlinear that the degree of asynchronization may become improperly big.

Further, Japanese Patent Laid-Open Publication No. H9-164925 discloses a structure in which an arm portion extending forward from the pedal rotational axis and a rotational element extending rearward from the stroke sensor are interconnected, wherein a pin is provided at a free end of the arm portion and a U-shaped groove is formed at the rotational element.

According to this conventional structure disclosed in the above-described Japanese patent document, since the stroke sensor is positioned inside the pedal bracket having the U shape in the plan view, the serviceability of the stroke sensor may be bad. Furthermore, this conventional structure is not configured to make the pedal rotational axis fall off its support portion when the collision load to make the pedal retreat toward the passenger side is applied to the vehicle body. Additionally, since the rotational element provided on a sensor side and the arm portion provided on a pedal side are arranged straightly along a line passing through the pedal rotational axis and the sensor's rotational center in a state in which the pedal is not depressed, there is a problem in that the degree of asynchronization of the pedal stroke and the rotation of the stroke sensor, i.e., the difference in rotation between the pedal and the stroke sensor, may become improperly big.

SUMMARY OF THE INVENTION

Accordingly, a primary object of the present invention is to provide a pedal stroke sensor attachment structure of an automotive vehicle which can properly improve the design flexibility of the arrangement and the attachment working space of the stroke sensor, and also attain the smooth falling-off of the pedal in the vehicle collision. A secondary object of the present invention is to provide the pedal stroke sensor attachment structure of the automotive vehicle which can further improve the synchronization (synchronous rate) of the pedal and the stroke sensor.

The present invention is a pedal stroke sensor attachment structure of an automotive vehicle, comprising a pedal device provided at a vehicle body positioned in front of a driver's seat, the pedal device comprising a bracket attached to the vehicle body, a hanging-type pedal supported at the bracket via a pedal rotational axis, a falling-off mechanism configured to make the pedal rotational axis fall off a support portion of the pedal rotational axis when a collision load to make the pedal retreat toward a passenger side is applied to the vehicle body, and a stroke sensor provided at the bracket to detect a depressing stroke of the pedal, and a link arm interlocking the stroke sensor with the pedal, wherein the stroke sensor is arranged to be offset downward relative to the pedal rotational axis, and the link arm includes an engaged portion, with which an engaging portion provided on the side of the pedal is slidably engaged, the engaged portion of the link arm being configured such that the engaging portion is slid vertically along the engaged portion by a specified length that is long enough to allow the falling-off of the pedal rotational axis performed by the falling-off mechanism.

According to the present invention, since the stroke sensor is arranged to be offset downward relative to the pedal rotational axis, the design flexibility of the arrangement and the attachment working space of the stroke sensor can be improved. Further, since the engaged portion of the link arm is configured such that the engaging portion is slid vertically along the engaged portion by the specified length that is long enough to allow the falling-off of the pedal rotational axis performed by the falling-off mechanism, the smooth falling-off of the pedal in the vehicle collision can be also attained.

In an embodiment of the present invention, the link arm is arranged to be offset relative to the stroke sensor in a vehicle width direction, the stroke sensor is arranged to be spaced apart from an end portion of the pedal rotational axis in the vehicle width direction, and the engaged portion is configured to extend downward to a position where the engaged portion overlaps the stroke sensor in a side view.

According to this embodiment, the pedal, in particular, its pedal rotational axis does not interfere with the stoke sensor when the pedal is made to fall off by the falling-off mechanism in the vehicle collision. In other words, because of the above-described configuration of the engaged portion of the link arm for sliding the engaging portion vertically along the engaged portion by the specified length long enough to allow the falling-off of the pedal rotational axis, and the above-described offset arrangement of the link arm relative to the stroke sensor and the above-described arrangement of the stroke sensor being spaced apart from the end portion of the pedal rotational axis, it can be prevented that the pedal's falling-off is blocked improperly by any of the link arm and the stroke sensor. Further, the pedal's falling-off can be attained more properly and surely, compared to a case in which the stroke sensor is directly connected to the stroke sensor by utilizing the link arm.

In another embodiment of the present invention, the link arm is configured such that the engaged portion is inclined relative to the pedal rotational axis and the link arm is rotatable downward when the pedal is depressed.

According to this embodiment, the smoother pedal's falling-off can be attained in the vehicle collision.

In another embodiment of the present invention, the link arm includes a link-arm rotational axis which is coaxial with the stroke sensor and is interlocked with the stroke sensor so as to rotate synchronously with the stroke sensor, and a ratio of a distance between the link-arm rotational axis and the engaging portion relative to a distance between the pedal rotational axis and the engaging portion is set to be small than 1.

According to this embodiment, since the distance between the link-arm rotational axis and the engaging portion is shorter than the distance between the pedal rotational axis and the engaging portion, the rotation of the link arm increases when the link arm rotates, following the pedal stroke. This action that the rotation of the link arm increases because of the above-described distance-ratio setting cancels (offsets) the action that the increase amount of the rotation of the link arm decreases which is derived from (caused by) the geometric characteristics that the distance between the link-arm rotational axis and the engaging portion provided on the pedal side becomes longer as the pedal stroke increases. Consequently, the synchronization (synchronous rate) of the stroke sensor synchronously rotating with the link arm and the rotation of the pedal can be improved. Moreover, the synchronous-type stroke sensor can be arranged to be offset relative to the pedal rotational axis, thereby improving the design flexibility. Thus, both the flexibility improvement of the offset arrangement of the stroke sensor and the synchronization (synchronous rate) of the pedal and the stroke sensor can be attained.

In another embodiment of the present invention, a position of the engaging portion in a state in which the pedal is not depressed is located on an anti-rotational direction side of a pedal depression within a range of the half of a pedal stroke or less relative to a line passing the pedal rotational axis and said link-arm rotational axis.

According to this embodiment, the above-described action that the rotation of the link arm increases because of the distance-ratio setting becomes so large that the area where the above-described action that the increase amount of the rotation of the link arm decreases is small can be utilized widely, so that both the synchronization (synchronous rate) improvement and the increase-rate improvement can be attained.

Herein, the accuracy of the rotation detection in an initial stage of depressing where the frequency of use is high can be more improved preferentially in a case in which the above-described position of the engaging portion located on the anti-rotational direction side of the pedal depression is much shorter than the pedal stroke.

In another embodiment of the present invention, the above-described position of the engaging portion is set to be located on the anti-rotational direction side of the pedal depression within the range of 35-45% of the pedal stroke.

According to this embodiment, the synchronization (synchronous rate) of the stroke sensor in the whole actual pedal-stroke stage and the synchronization (synchronous rate) in the depressing initial stage can be balanced in the high level.

In another embodiment of the present invention, the above-described ratio is set within 91.6-99%.

According to this embodiment, since the ratio of the distance between the link-arm rotational axis and the engaging portion relative to the distance between the pedal rotational axis and the engaging portion is set within 91.6-99%, the error can be suppressed to nearly 1% on the increase side in the first half of the pedal stroke, and also suppressed more than the case of being equal (the distance between the link-arm rotational axis and the engaging pin is equal to the distance between the pedal rotational axis and the engaging pin) in the maximum pedal stroke (about 20°, for example).

In another embodiment of the present invention, the above-described distance between the link-arm rotational axis and the engaging portion is shorter than a distance between the link-arm rotational axis and a sensor connection portion where the link-arm rotational axis and said link arm are connected to said stroke sensor, or a distance between the link-arm rotational axis and an outline of the stroke sensor near said sensor connection portion.

According to this embodiment, by utilizing the structure in which the link arm and the stroke sensor are formed separately from each other, the distance between the link-arm rotational axis and the engaging portion can be set to be short regardless of the size of the stroke sensor, thereby making the increase ratio properly high.

In another embodiment of the present invention, the stroke sensor includes a connector which is engaged therewith in a direction perpendicular to an axial direction thereof, a position and a rotational range of a sensor connection portion to the link arm is set to be within a specified range relative to the connector, and the link arm slants such that an angle which is formed by a direction of the engaged portion and a direction of the sensor connection portion relative to the link-arm rotational axis makes the connector of the stroke sensor look rearward through downward.

According to this embodiment, since the connector of the stroke sensor is made to look rearward through downward by the above-described angle setting, both the superior insertion performance of the connector and the downward-offset arrangement of the stroke sensor can be attained.

In another embodiment of the present invention, the stroke sensor includes a connector which is engaged therewith in a direction perpendicular to an axial direction thereof, a position and a rotational range of a sensor connection portion to the link arm is set to be within a specified range relative to the connector, and the link arm slants such that an angle which is formed by a direction of the engaged portion and a direction of the sensor connection portion relative to the link-arm rotational axis makes the connector of the stroke sensor look toward a trunk line of a harness.

According to this embodiment, since the connector of the stroke sensor is made to look toward the trunk line of its harness by the above-described angle setting, both shortening of the harness and the offset arrangement of the stroke sensor can be attained.

In another embodiment of the present invention, there is provided a sensor attaching bracket which attaches the stroke sensor to the bracket, the link arm is pivotally supported at a pedal-side portion of the sensor attaching bracket, the stroke sensor is attached to an anti-pedal side portion of the sensor attaching bracket which is located oppositely to the pedal, and a detection terminal which is pivotally supported at the stroke sensor is engaged with the link arm from an anti-pedal side.

According to this embodiment, attaching and detaching of the stoke sensor for the sensor attaching bracket is easy, so that the attachment flexibility and the serviceability of the stroke sensor can be improved.

Other features, aspects, and advantages of the present invention will become apparent from the following description which refers to the accompanying drawings.

DETAILED DESCRIPTION OF THE INVENTION

Figure 1:
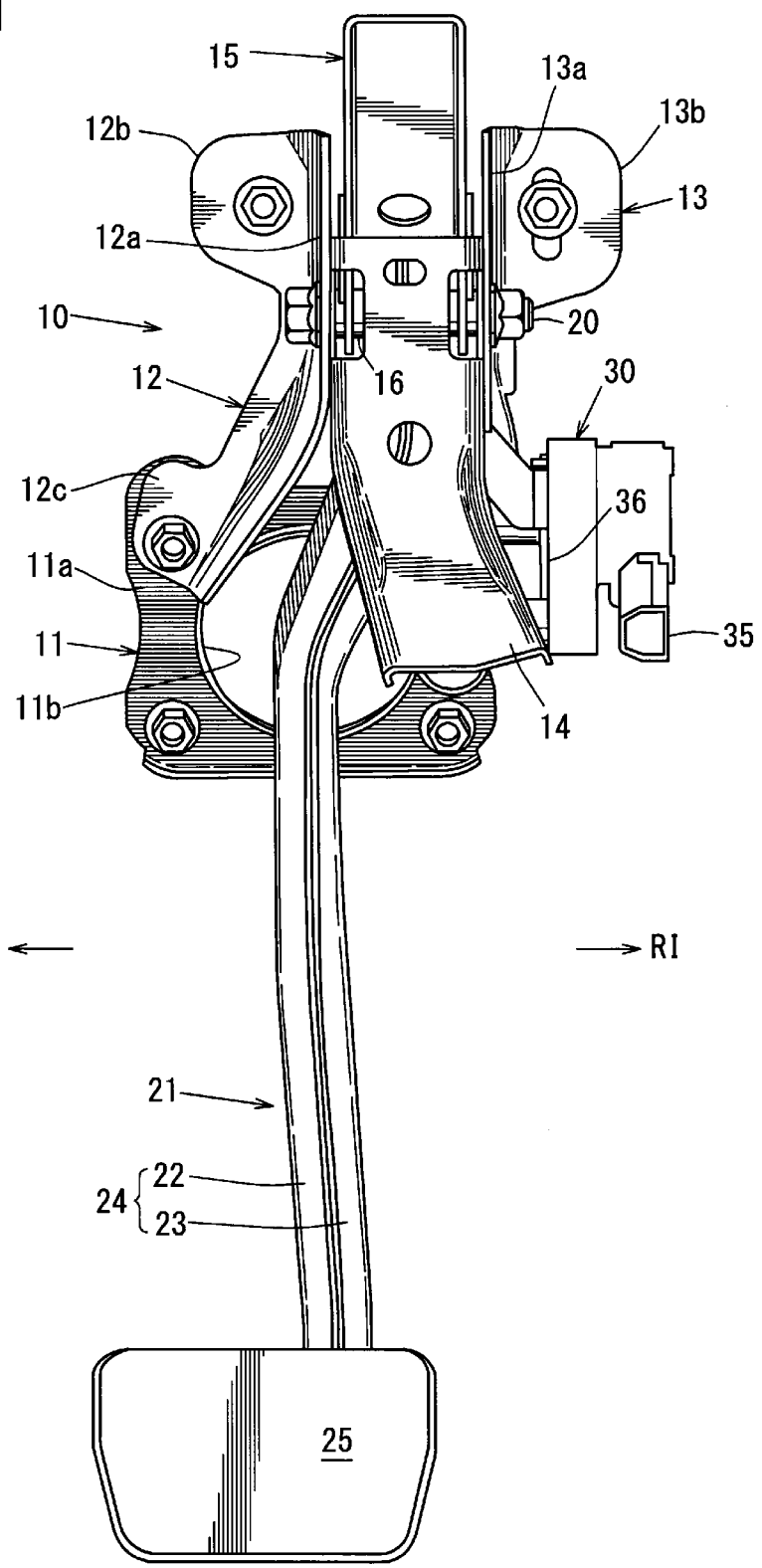
FIG. 1 is an elevational view of a pedal device provided with a pedal stroke sensor attachment structure of an automotive vehicle of the present invention, when viewed from the vehicle rear.
Figure 3:
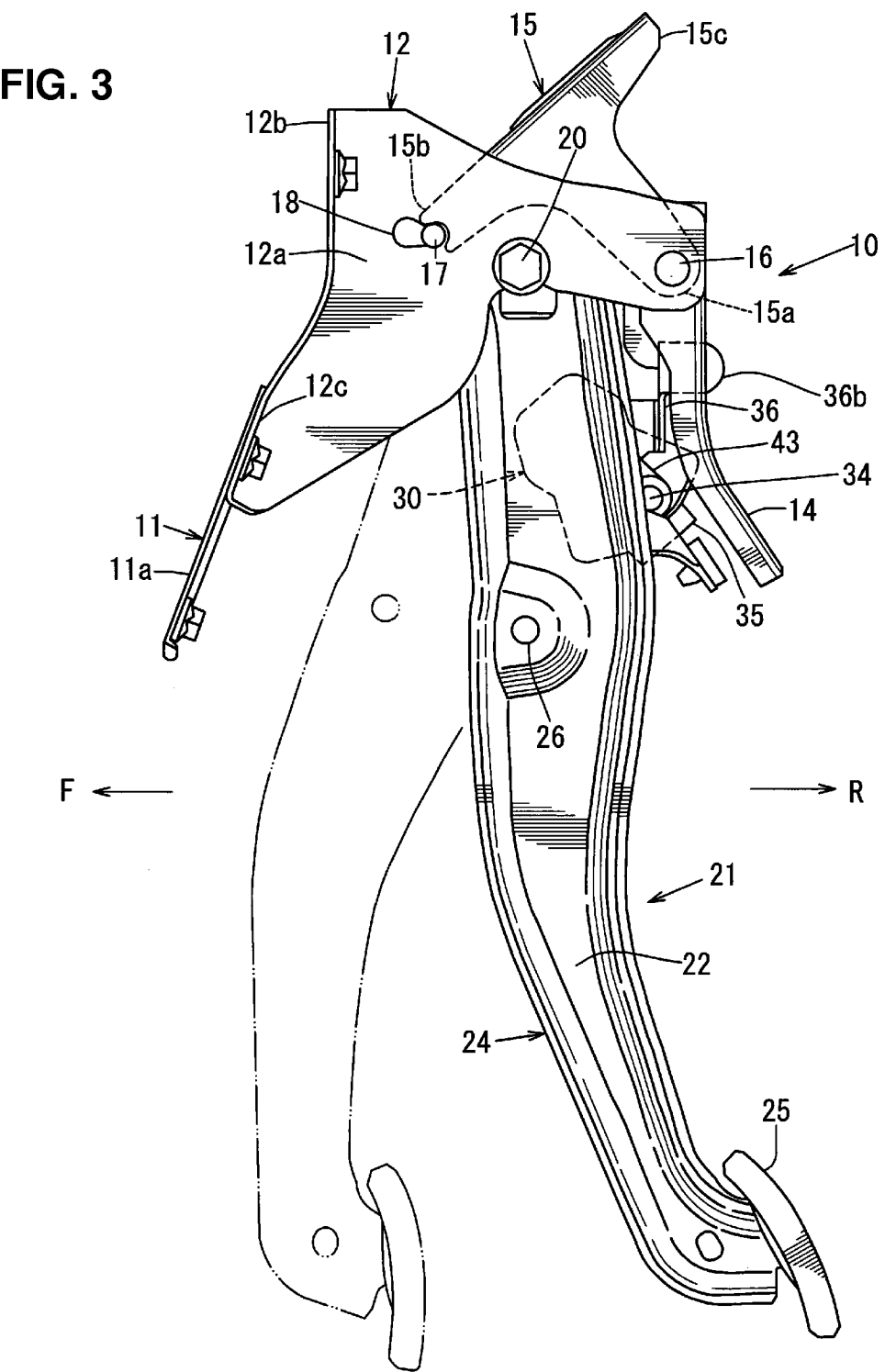
FIG. 3 is a left side view of the pedal device.
Figure 4:
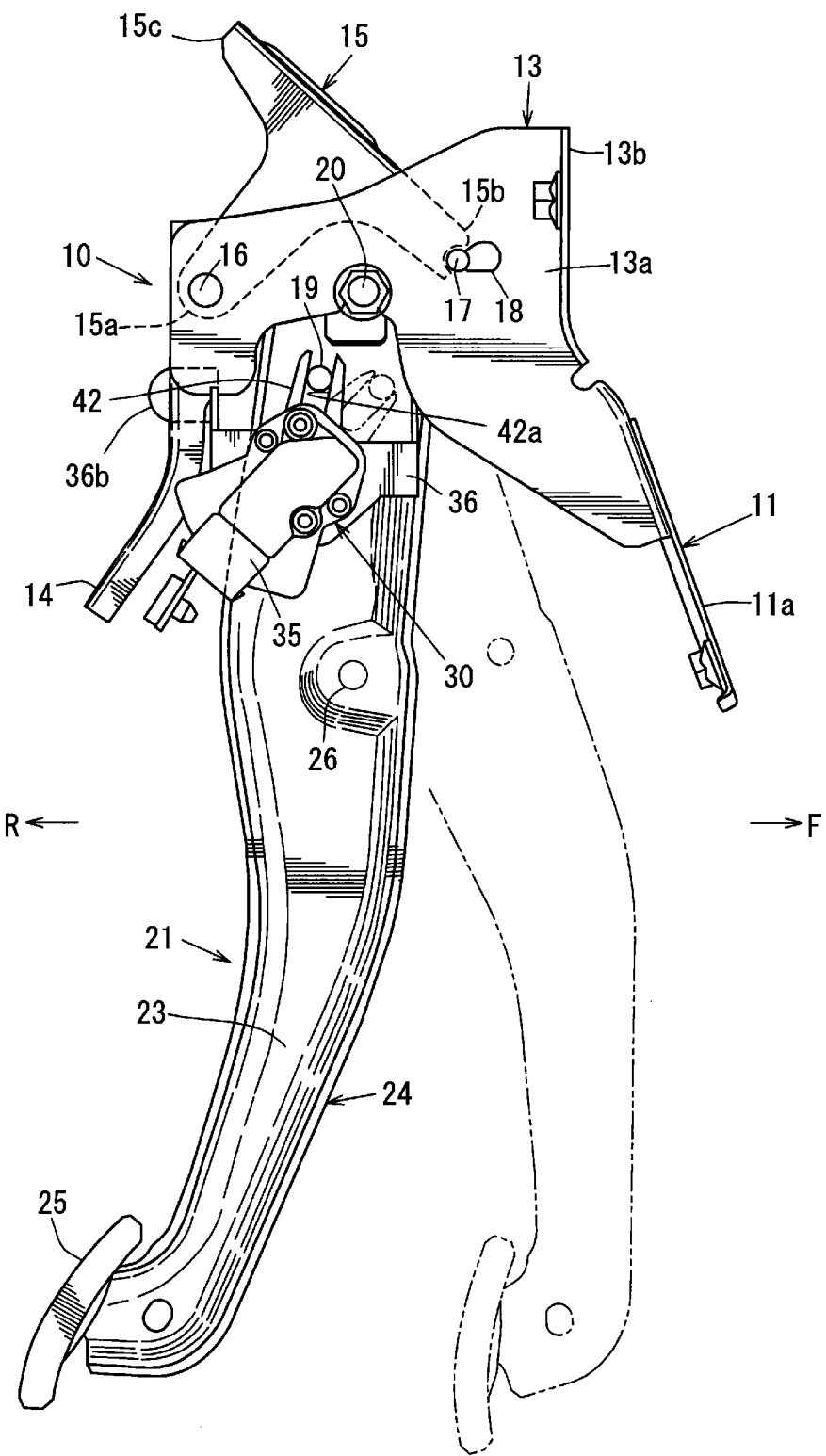
FIG. 4 is a right side view of the pedal device.

Hereafter, an embodiment of the present invention will be described specifically referring to the drawings. The drawings show a pedal stroke sensor attachment structure of an automotive vehicle. FIG. 1 is an elevational view of a pedal device provided with the present pedal stroke sensor attachment structure, when viewed from the vehicle rear, FIG. 2 is a back view of the pedal device, when viewed from the vehicle front, FIG. 3 is a left side view of the pedal device, FIG. 4 is a right side view of the pedal device, FIG. 5 is a plan view of the pedal device, and FIG. 6 is a bottom view of the pedal device.

Further, the present embodiment exemplifies a brake pedal as the pedal device. In the figures, an arrow F shows a vehicle forward direction, an arrow R shows a vehicle rearward direction, an arrow LE shows a leftward direction in a vehicle width direction, and an arrow RI shows a rightward direction in the vehicle width direction, and an arrow UP shows a vehicle upward direction.

As shown in FIGS. 1-6, a pedal device 10 (brake pedal device) is provided at a vehicle body provided in front of a driver's seat, such as a dash panel. This pedal device 10 comprises a base bracket 11 and right-and-left pedal brackets 12, 13 which are attached to the vehicle body (see a dash lower panel), and a hanging-type brake pedal 21 which is supported at the pedal brackets 12, 13 via the pedal rotational axis 20. The right-and-left pedal brackets 12, 13 are arranged to be spaced apart from each other in the vehicle width direction, and the base bracket 11 located forward is provided to interconnect lower portions of respective front ends of the right-and-left pedal brackets 12, 13.

Figure 2:
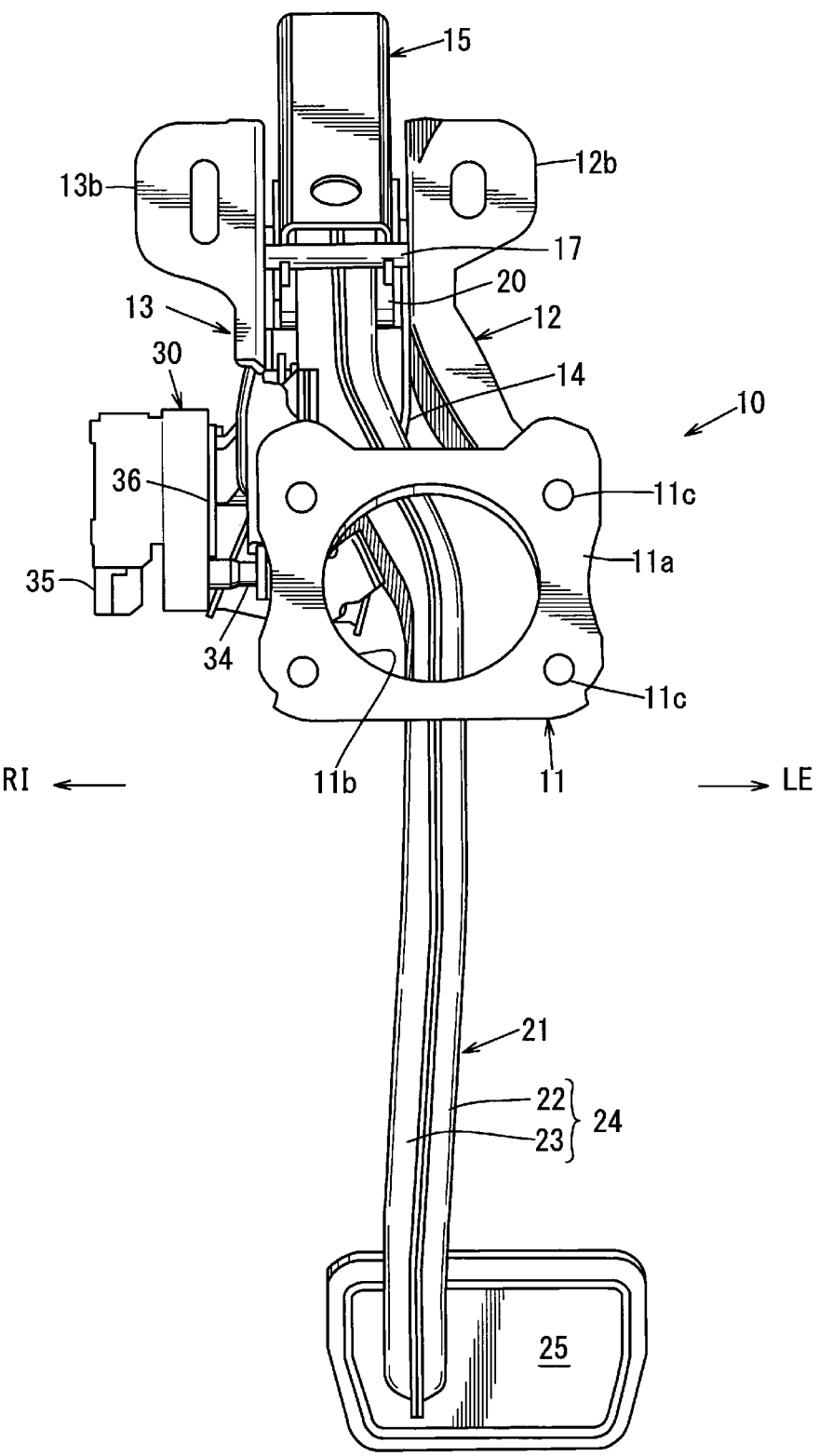
FIG. 2 is a back view of the pedal device, when viewed from the vehicle front.
Figure 5:
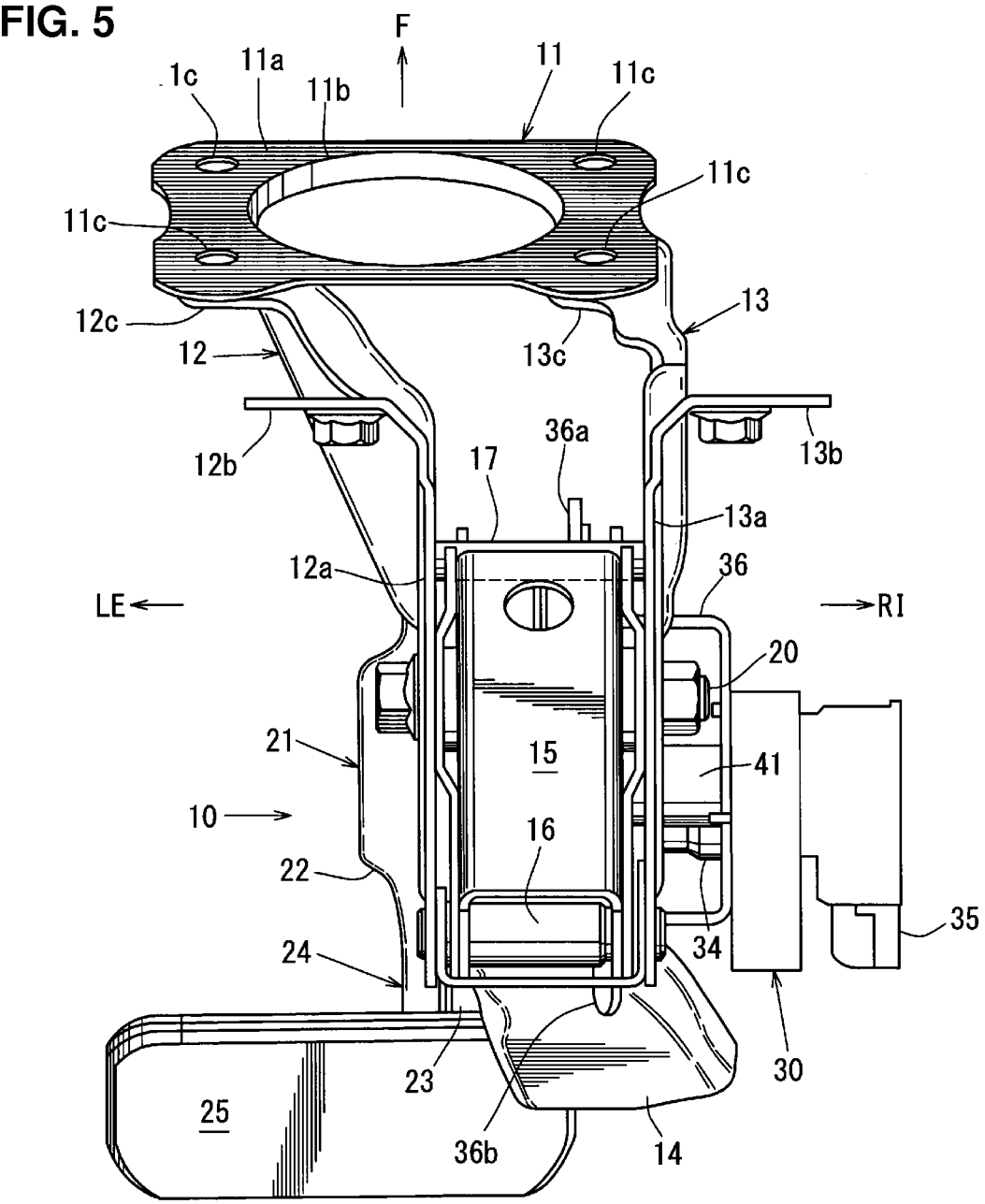
FIG. 5 is a plan view of the pedal device.
Figure 6:
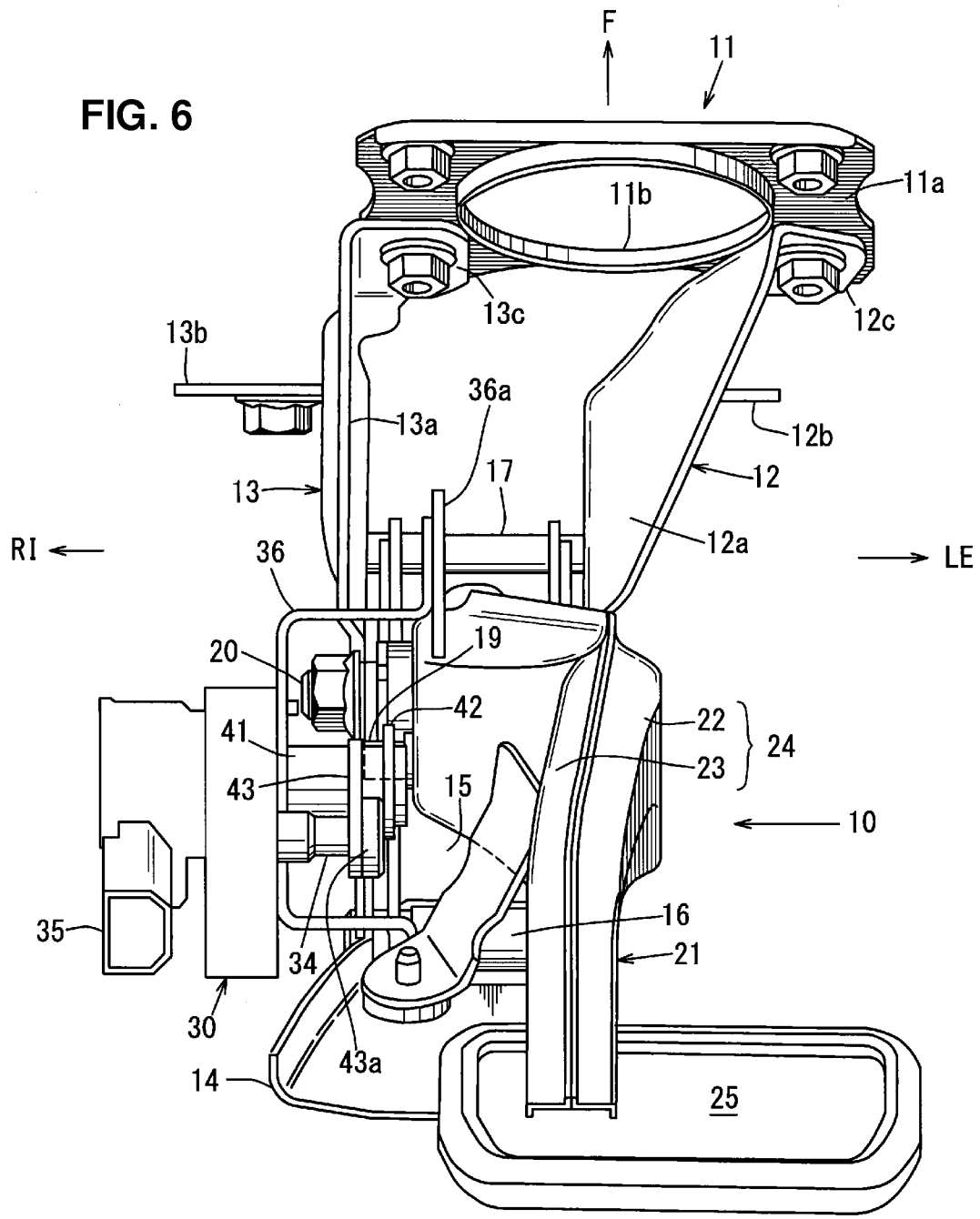
FIG. 6 is a bottom view of the pedal device.

As shown in FIGS. 2 and 5, the base bracket 11 has an opening 11b at a central portion of a bracket body 11a, and plural attachment portions 11c are formed at a peripheral portion of the opening 11b. A rear portion of a brake booster including a valve operating rod (a so-called push rod) is arranged in the opening 11b.

As shown in FIGS. 3, 5 and 6, the left-side pedal bracket 12 is configured to extend upward and rearward from the base bracket 11, and this left-side pedal bracket 12 integrally has an upper attachment piece 12b and a lower attachment piece 12c which are bent leftward in the vehicle width direction at a front portion of the bracket body 12a and has a support portion which opens downward at a middle portion, in a longitudinal direction, of the bracket body 12 in order to support the pedal rotational axis 20 so that the pedal rotational axis 20 can fall off. This support portion is configured similarly to a support portion 13*d* (see FIG. 7) which will be described below.

As shown in FIGS. 4, 5 and 6, the right-side pedal bracket 13 is configured to extend upward and rearward from the base bracket 11, and this right-side pedal bracket 13 integrally has an upper attachment piece 13*b* which is bent rightward in the vehicle width direction at an upper side of a front portion of the bracket body 13*a* and a lower attachment piece 13*c* which is bent leftward in the vehicle width direction at a lower side of the front portion of the bracket body 13*a* and has the support portion 13*d* (see FIG. 7) which opens downward at a middle portion, in a longitudinal direction, of the bracket body 13 in order to support the pedal rotational axis 20 so that the pedal rotational axis 20 can fall off.

Figure 7:
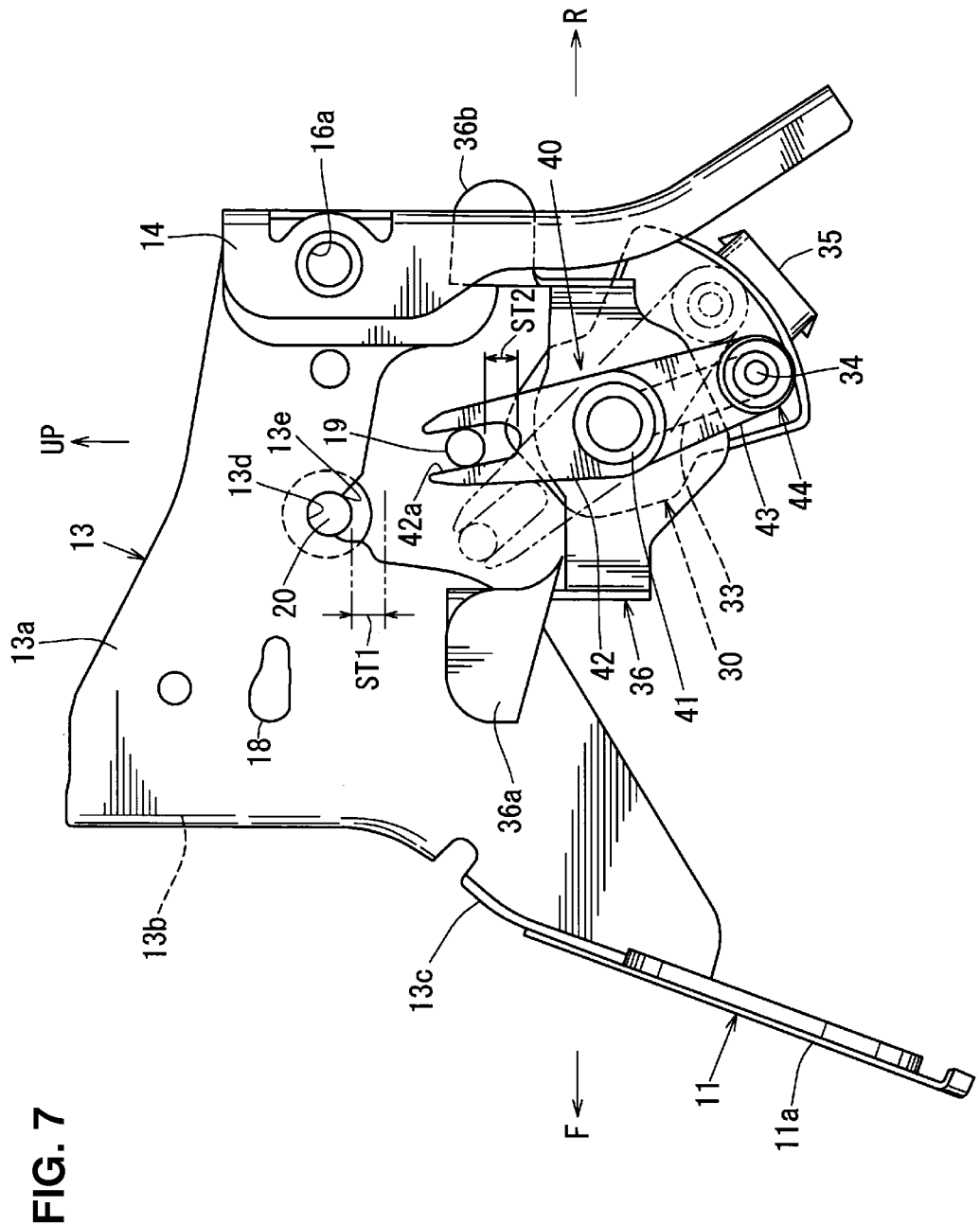
FIG. 7 is a left side view showing the pedal stroke sensor attachment structure.

As shown in FIG. 7, the above-described support portion 13*d* is configured such that a lower end portion of its open side is narrowed (reduced), thereby forming a throttle (narrow) portion 13*e*. The support portion 12*d* is configured such that the falling-off of the pedal rotational axis 20 is restricted by the throttle portion 13*e* in a normal state, whereas the throttle portion 13*e* is configured to be expanded by the pedal rotational axis which is pressed down by a rotational lever 15, which will be described later, in the vehicle collision, thereby allowing the falling-off of the pedal rotational axis 20. Herein, the support portion of the left-side pedal bracket 12 is configured similarly to the support portion 13*d* of the right-side pedal bracket 13.

As shown in FIGS. 1, 3 and 4, there is provided a bracket connecting member 14 which is of a U shape in a plan view (i.e., when viewed from above) and interconnects respective rear end portions of the bracket bodies 12*a*, 13*a* of the right-and-left pedal brackets 12, 13, thereby improving the pedal support rigidity.

As shown in FIGS. 3 and 4, there is provided a rotational lever 15 as a falling-off mechanism which is configured to make the pedal rotational axis 20 fall off the support portion 13*d* (see FIG. 7) when a collision load to make the brake pedal 21 retreat toward a passenger side is applied to the above-described vehicle body (see the dash lower panel) in a vehicle frontal collision. Specifically, the above-described falling-off mechanism comprises the rotational lever 15 and a contact member, not illustrated, which is provided to protrude vehicle forward from an instrument panel member (specifically, an instrument panel reinforcement) provided on the vehicle-body side.

This rotational lever 15 is formed in a roughly T shape in a side view (i.e., when viewed from the vehicle side) as shown in FIGS. 3 and 4, and in a gate shape in an elevational view (i.e., when viewed from the vehicle rear) as shown in FIG. 1. A lower end portion 15*a* of the rotational lever 15 is pivotally supported via a rotational lever axis 16, and a front end portion 15*b* of the rotational lever 15 is held by a stopper 17 so as to restrict a movement of rotational lever 15 in the normal state (vehicle non-collision). This stopper 17 is made of a shaft member.

The rotational lever 15 is arranged between the right-and-left pedal brackets 12, 13. The above-described rotational lever axis 16 is provided to extend between the right-and-left pedal brackets 12, 13, passing through a through hole 16*a* (see FIG. 7) which is formed at a forward-bent portion of the bracket connecting member 14. Further, the above-described stopper 17 is provided to extend between respective end portions of stopper-support hole portions 18, 18 which are formed at the bracket bodies 12*a*, 13*a* of the pedal brackets 12, 13 in a non-circular (a gourd, in the present embodiment) and long-hole shape.

When the collision load (the frontal-collision load) to make the brake pedal 21 retreat toward the passenger side is applied to the vehicle body, the rear end portion 15*c* of the above-described rotational lever 15 as the falling-off mechanism contacts the contact member (not illustrated) protruding forward from the instrument panel member. Accordingly, the stopper 17 is moved vehicle forward in the stopper support hole portion 18 by this contact impact, so that the restriction of the front end portion 15*b* of the rotational lever 15 by the stopper 17 is released. Thereby, the rotational lever 15 rotates downward around a support point of the rotational lever axis 16. Consequently, the pedal rotational axis 20 is made to fall off the support portion 13*d* (see FIG. 7).

As shown in FIGS. 1-6, the brake pedal 21 is arranged to be longitudinally rotatable (swingable) around the pedal rotational axis 20. This brake pedal 21 comprises a pedal arm 24 which comprises two members 22, 23 jointly fixed together and is formed in a hollow shape, having the lightweight high-rigidity, and a depressing face portion 25 (a so-called pedal depressing portion) which is attached to a rear portion of a lower end of the pedal arm 24. As shown in FIGS. 3 and 4, a connection hole 26 as a connection portion to connect a rear end portion of the valve operating rod is formed at a middle portion, in a vertical direction, of the pedal arm 24.

As shown in FIGS. 4, 5 and 6, a stroke sensor 30 to detect a depressing stroke of the brake pedal 21 is provided at the right-side pedal bracket 13. This stroke sensor 30 is arranged to be offset downward and rearward relative to the pedal rotational axis 20 as shown in FIG. 4.

Figure 8:
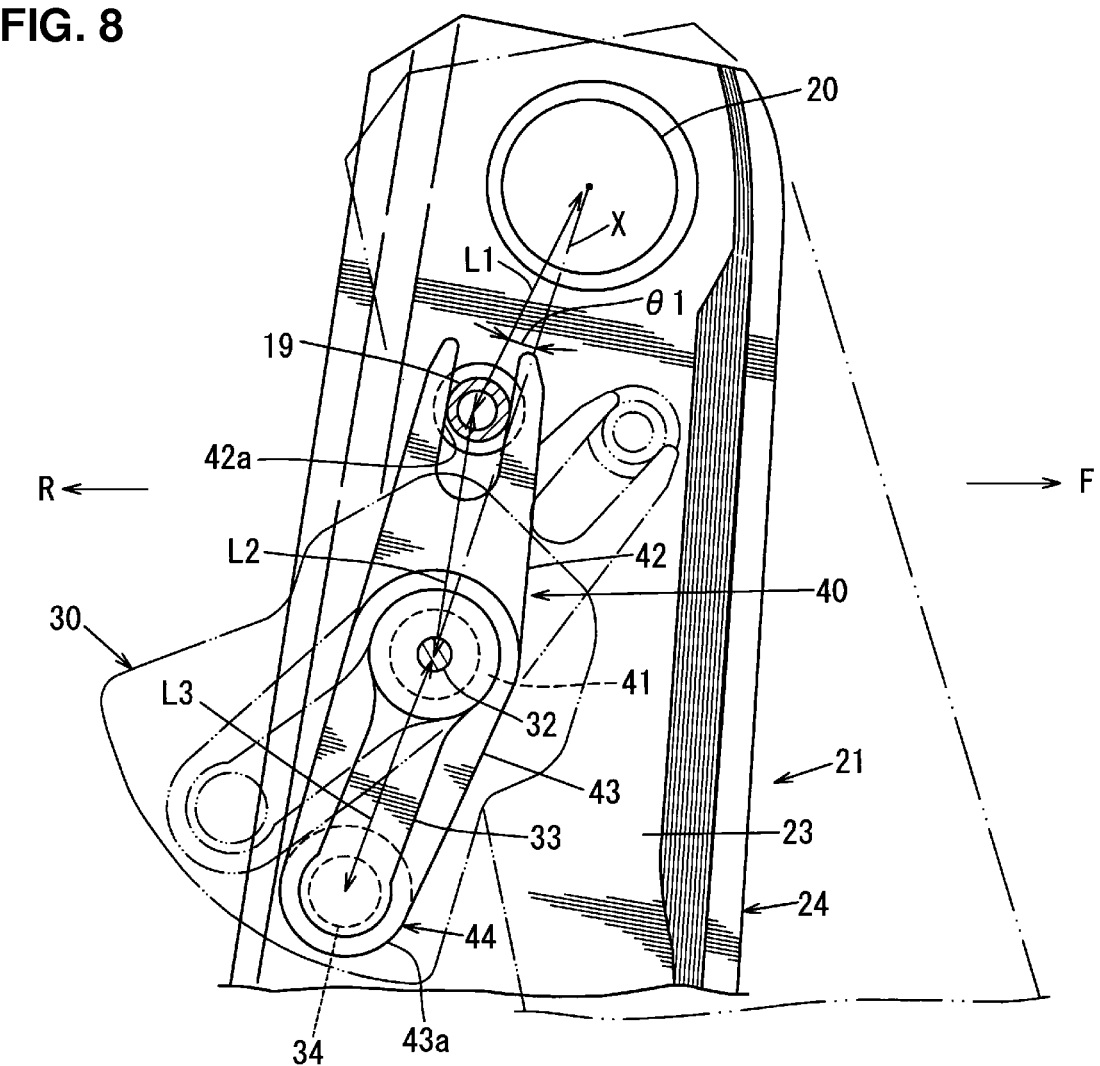
FIG. 8 is a right side view showing the pedal stroke sensor attachment structure.
Figure 9:
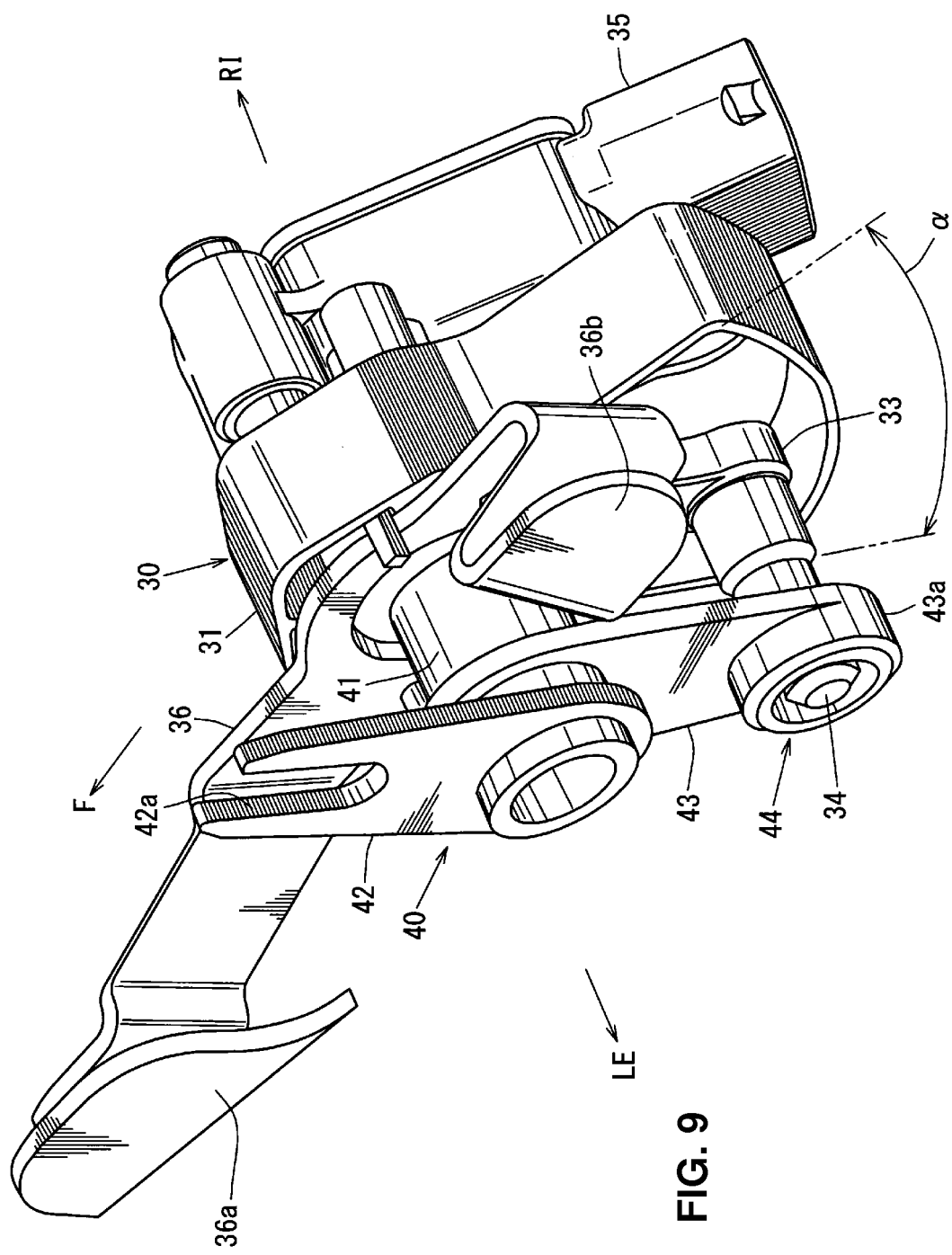
FIG. 9 is a perspective view showing an attachment structure of a sensor attaching bracket, link arms, and a stroke sensor.
Figure 10:
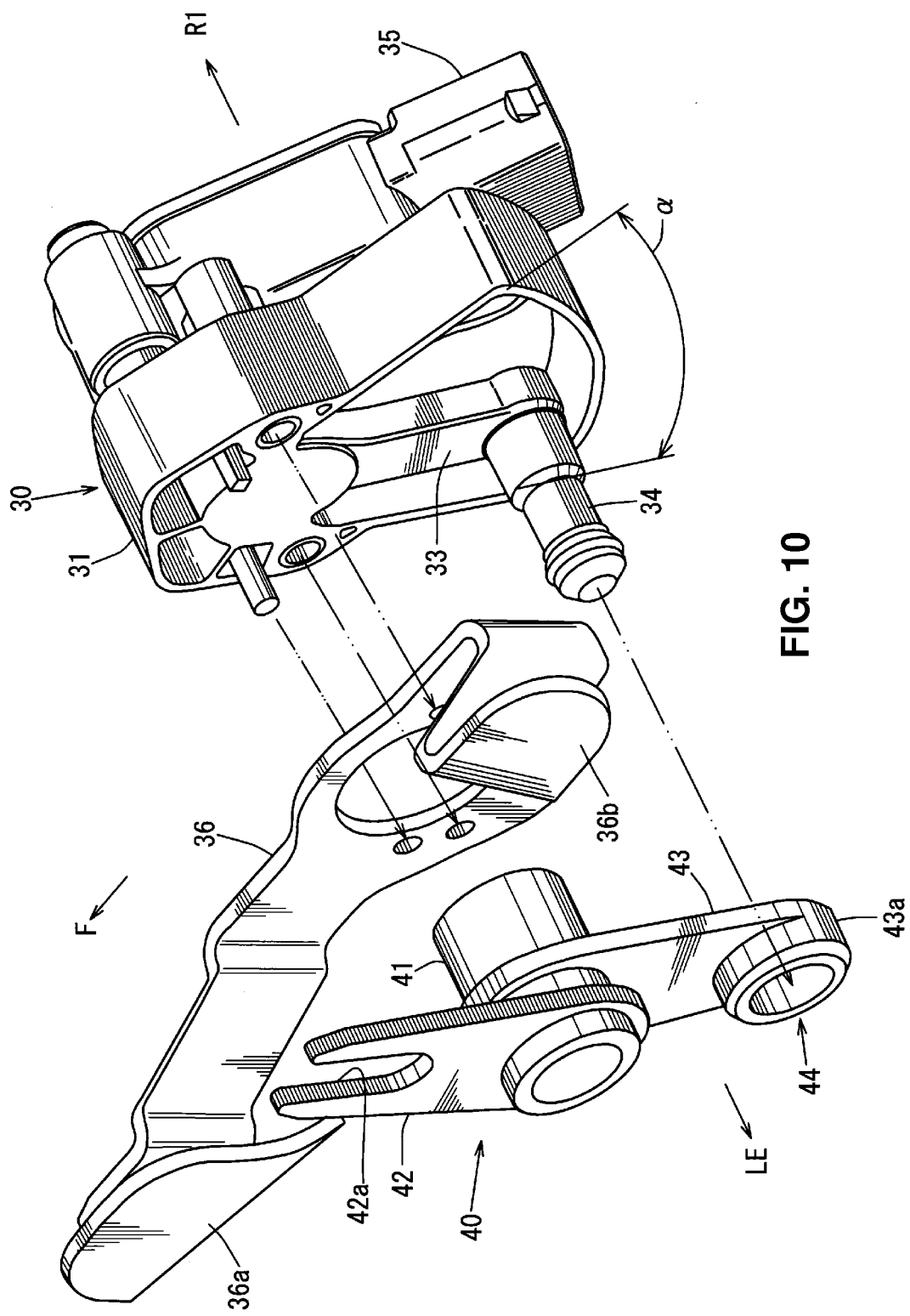
FIG. 10 is an exploded perspective view of the sensor attaching bracket, the link arms, and the stroke sensor.
Figure 11A:
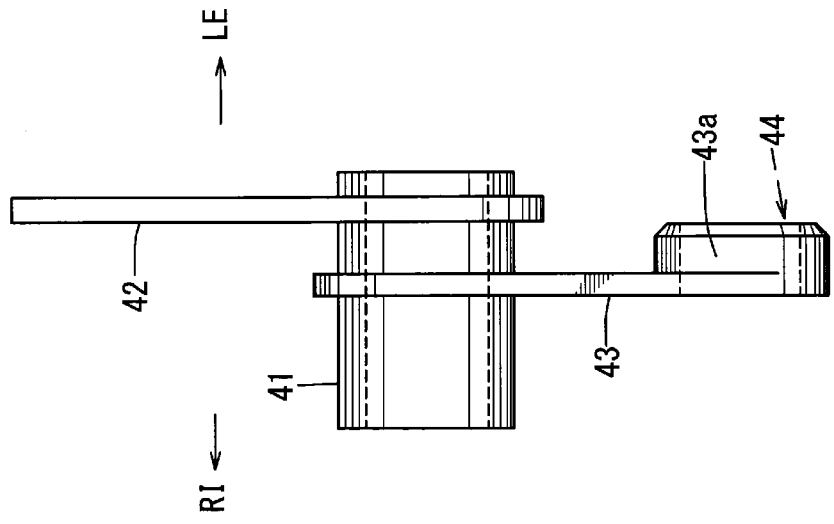
FIG. 11A is a right side view showing a structure of the link arms and a link-arm rotational axis.
Figure 11B:
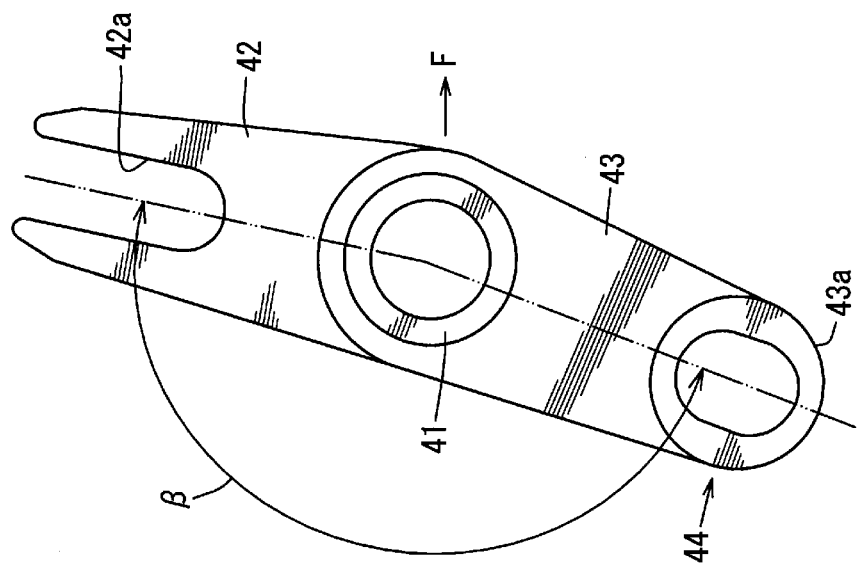
FIG. 11B is an elevational view of the structure shown in FIG. 11A, when viewed from the vehicle front.

FIG. 7 is a left side view showing the pedal stroke sensor attachment structure, omitting the left-side pedal bracket 12 and the brake pedal 21, FIG. 8 is a right side view showing the attachment structure of the stroke sensor 30 which is illustrated by a two-dotted broken line, FIG. 9 is a perspective view showing an attachment structure of the sensor attaching bracket, the link arms, and stroke sensor, FIG. 10 is an exploded perspective view of the sensor attaching bracket, the link arms, and the stroke sensor, and FIG. 11A is a right side view showing a structure of the link arms and a link-arm rotational axis, and FIG. 11B is an elevational view of the structure shown in FIG. 11A, when viewed from the vehicle front.

As shown in FIGS. 9 and 10, the stroke sensor 30 includes a potentiometer or hole element in its sensor housing 31, and a rotational center of a detection terminal 33 is attached to a sensor axis 32 (see FIG. 8). At a free end portion (lower end portion) of this detection terminal 33 is integrally provided a link engaging protrusion portion 34 which protrudes leftward in the vehicle width direction. The stroke sensor 30 further includes a connector 35 which is engaged in a direction perpendicular to its axial direction.

As shown in FIGS. 9 and 10, there is provided a sensor attaching bracket 36 which attaches the stroke sensor 30 to the right-side pedal bracket 13 which is a non-rotatable fixed member, and as shown in FIGS. 5 and 6, and the stroke sensor 30 is attached to the right-side pedal bracket 13 via this sensor attaching bracket 36 as shown in FIGS. 5 and 6. The sensor attaching bracket 36 comprises a front piece 36*a* and a rear piece 36*b*.

As shown in FIGS. 7 and 8, a link mechanism 40 which interlocks the stroke sensor 30 with the brake pedal 21 is provided, which includes a link-arm rotational axis 41 which is coaxial with the sensor axis 32 of the stroke sensor 30 and upper-and-lower link arms 42, 43 which are interlocked with the stroke sensor 30 so as to rotate synchronously.

Herein, as shown in FIGS. 9 and 10, the upper link arm 42 is provided to extend upward from the link-arm rotational axis 41, and the lower link arm 43 is provided to extend downward from the link arm rotational axis 41.

Further, as shown in FIGS. 9 and 10, the link arms 42, 43 are pivotally supported at a pedal-side portion of the sensor attaching bracket 36 which is located on the side of the brake pedal 21 (i.e., on the left side in the vehicle width direction), and the stroke sensor 30 is attached to an anti-pedal side portion of the sensor attaching bracket 36 which is located oppositely to the brake pedal 21 (i.e., on the right side in the vehicle width direction). Further, the link engaging protrusion portion 34 provided at the free end of the detection terminal 33 rotatably provided at the stroke sensor 30 is engaged with a boss portion 43a of the lower link arm 43 from the opposite side to the brake pedal 21 (i.e., from the right side (from a vehicle outside in the present embodiment)). Through this engagement, a sensor connection portion 44 where the link arms 42, 43 are connected to the stroke sensor 30 is formed. As shown in FIG. 11A, the sensor connection portion 44 has a vertically-long hole portion.

As shown in FIG. 4, an engaging pin 19 as an engaging portion which protrudes rightward from the right-side member 23 of the pedal arm 24 of the brake pedal 21 is attached to a portion of the right-side member 23 which is located below the pedal rotational axis 20 and above the link-arm rotational axis 41. This engaging pin 19 functions for transmitting the move of the brake pedal 21 to the upper link arm 42.

As shown in FIGS. 4, 7 and 8, an engaged groove 42a as an engaged portion which is slidably connected in a direction perpendicular to an axial-center direction of the engaging pin 19 is provided at an free end (an upper end) of the upper link arm 42. The engaged groove 42a is configured to open upward.

Since the engaging pin 19 is vertically slidably engaged with the engaged groove 42a of the upper link arm 42, the upper link arm 42 is rotated forward around the link-arm rotational axis 41 by the engaging pin 19. Further, since the lower link arm 43 integrally formed at the ling-arm rotational axis 41 is rotated rearward around the link-arm rotational axis 41, the move of the link-arms 42, 43 is transmitted to the detection terminal 33 via the sensor connection portion 44 and the link engaging protrusion portion 34. Accordingly, the detection terminal 33 rotates counterclockwise as shown in FIGS. 7 and 9 and clockwise as shown in FIG. 8. The stroke sensor 30 detects the depressing stroke of the brake pedal 21 with the sensor axis 32 being rotated by the detection terminal 33.

Further, as shown in FIG. 8, a ratio of a distance L2 between the center of the link-arm rotational axis 41 and the center of the engaging pin 19 relative to a distance L1 between the center of the pedal rotational axis 20 and the center of the engaging pin 19 is set to be small. That is, L2/L1 is set to be smaller than 1.

Figure 12:
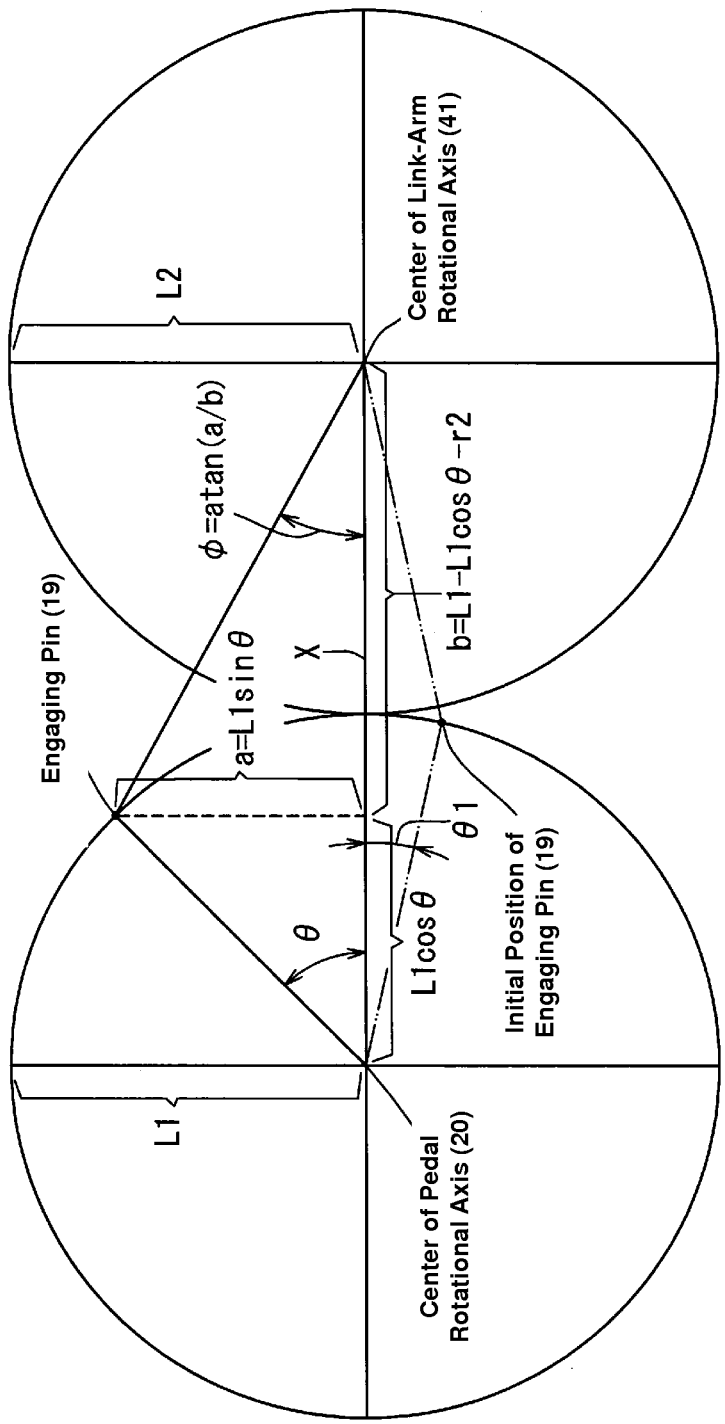
FIG. 12 is an explanatory diagram a relationship of a pedal stroke angle and a link-arm rotational angle.

As described above, since the distance L2 between the center of the link-arm rotational axis 41 and the center of the engaging pin 19 is set to be smaller than the distance L1 between the center of the pedal rotational axis 20 and the center of the engaging pin 19 (L2<L1), i.e., the ratio of the distance L2 relative to the distance L1 is set to be smaller than 1, the rotation of the link arm 42 increases when the link arm 42 rotates, following the pedal stroke (herein, the increase of the link arm's rotation becomes 1/ra which is the reciprocal of ra (the ratio: ra)). This action that the rotation of the link arm 42 increases because of the above-described distance-ratio setting cancels (offsets) an action that the increase amount of the rotation of the link arm 42 decreases which is derived from (caused by) the geometric characteristics (see FIG. 12) that the distance between the link-arm rotational axis 41 and the engaging pin 19 provided on the side of the pedal 21 becomes longer as the pedal stroke increases (herein, in a case where the ratio L1:L2 is 1:1, the increase amount of the rotation of the link arm 42 decreases, resulting in θ>φ). Consequently, the synchronization (synchronous rate) of the stroke sensor 30 synchronously rotating with the link arm 42 and the rotation of the brake pedal 21 can be improved.

In FIGS. 3, 4 and 8, a normal state in which the brake pedal 21 is not depressed (non-braking state) is shown by the solid line, and a braking state in which the brake pedal 21 is depressed is shown by the two-dotted broken line.

As shown in FIG. 8, the central position of the engaging pin 19 in the normal state in which the brake pedal 21 is not depressed is located on an anti-rotational direction side of the pedal depression (see an angle θ1 of FIG. 8) within the range of the half of the whole pedal stroke or less relative to a line X passing the center of the pedal rotational axis 20 and the center of the link-arm rotational axis 41. In FIG. 8, the anti-rotational direction side is the side to the left of line X.

As described above, the present embodiment is configured such that the distance L2 between the center of the link-arm rotational axis 41 and the center of the engaging pin 19 is shorter than the distance L1 between the pedal rotational axis 20 and the engaging pin 19 (L2<L1), so that the rotation of the link arm 42 increases when the link arm 42 rotates, following the pedal stroke. This action that the rotation of the link arm 42 increases because of the distance-ratio setting (L2<L1) becomes so large that the area where the above-described action that the increase amount of the rotation of the link arm 42 decreases is small can be utilized widely, so that both the synchronization (synchronous rate) improvement and the increase-rate improvement can be attained.

Further, the present embodiment is configured such that the position of the engaging pin 19 located on the anti-rotational direction side (see an angle θ1 of FIG. 8) is the half of the whole pedal stroke or less, thereby shorter than the pedal stroke, so that the accuracy of the rotation detection in an initial stage of depressing where the frequency of use is high is improved.

Herein, the present embodiment is configured such that the central position of the engaging pin 19 is set to be located on the anti-rotational direction side (see an angle θ1 of FIG. 8) within the range of 35-45% of the whole pedal stroke (the maximum stroke is 20° for example), preferably 40%, so that the synchronization (synchronous rate) of the stroke sensor 30 in the whole actual pedal-stroke stage and the synchronization (synchronous rate) in the depressing initial stage are balanced in a high level.

Further, the present embodiment is configured such that the ratio of the distance L2 relative to the distance L1 is set to be 91.6-99%, so that the error of the pedal stroke angle θ and the link-arm angle φ (see FIG. 12) is suppressed to nearly 1% on the increase side in the first half of the pedal stroke, and also suppressed more than a case of an equal length (L1:L2 is 1:1) in the maximum pedal stroke (about 20°, for example).

It is preferable that the above-described ratio of the distance L2 relative to the distance L1 be within 94.1-99% in the range of 91.6-99%. By setting the ratio=94.1-99%, the error of the pedal stroke angle θ and the link-arm angle φ (see FIG. 12) can be on the increase side in the first half of the pedal stroke, and also be smaller on the increase side, compared to the case of the equal length (L1:L2 is 1:1) as a whole.

Further, it is preferable that the ratio of the distance L2 relative to the distance L1 be within 94.1-95.6% in the range of 91.6-99% in a case in which the central position of the engaging pin 19 is located at 8° on the anti-rotational direction side relative to the line X (see the angle θ1). By setting the ratio=94.1-95.6%, the sensor rotation amount relative to the stroke can be increased (amplified) in the whole actual pedal-stroke range, and also the error can be smaller, compared to the case of the equal length (L1:L2 is 1:1) as a whole.

Herein, it is preferable that the ratio of the distance L2 relative to the distance L1 be set such that the resolvability of the stroke sensor 30 at least in the first half of the pedal stroke is two or more for one degree, thereby detecting the pedal stroke with high accuracy. It is also preferable that the ratio of the distance L2 relative to the distance L1 be set such that the pedal stroke range almost matches with the rotational range of the stroke sensor 30 (for example, such that in a case in which the rotational range of the stroke sensor 30 is 50-60°, the pedal stroke range is its 50%), so that the pedal stroke is accurately detected with the maximum resolvability by effectively using the rotational range of the stroke sensor 30.

Further, as shown in FIG. 8, the distance L2 between the center of the link-arm rotational axis 41 and the center of the engaging pin 19 is set to be shorter than that between the center of the link-arm rotational axis 41 and the center of the sensor connection portion 44 where the lower link arm 43 is connected to the detection terminal 33 (L2<L3).

The present embodiment is configured such that by setting L2<L3, the distance L2 between the center of the link-arm rotational axis 41 and the center of the engaging pin 19 is made short regardless of the size of the stroke sensor by utilizing the configuration that the link-arms 42, 43 and the stroke sensor 30 are formed separately from each other, thereby increasing the increase rate.

Herein, the distance L2 between the center of the link-arm rotational axis 41 and the center of the engaging pin 19 may be set to be shorter than the distance between the center of the link-arm rotational axis 41 and an outline of the stroke sensor 30 near the sensor connection portion 44 in place of the above-described setting L2<L3.

Herein, as shown in FIGS. 9 and 10, the stroke sensor 30 includes the above-described connector 35, the position and the rotational range a of the sensor connection portion 44 to the lower link arm 43 is set to be within a specified range relative to the connector 35 by a fan-shaped recess portion of the sensor housing 31 shown in these figures, and the link arms 42, 43 slant such that an angle β which is formed by the direction of the engaged groove 42a and the direction of the sensor connection portion 44 relative to the center of the link-arm rotational axis 41 (see FIG. 11A, i.e., an open angle between a longitudinal-direction center line of the upper link arm 42 and a longitudinal-direction center line of the lower link arm 43) makes the connector 35 of the stroke sensor 30 look rearward through downward.

That is, the present embodiment is configured such that by setting the above-described angle β, the connector 35 of the stroke sensor 30 is made to look rearward through downward, so that both the superior insertion performance of the connector 35 and the downward-offset arrangement of the stroke sensor 30 are attained. The present embodiment is further configured such that the link arms 42, 43 slant such that the angle β formed by the direction of the engaged groove 42a and the direction of the sensor connection portion 44 relative to the center of the link-arm rotational axis 41 (see FIG. 11A) makes the connector 35 of the stroke sensor 30 look toward a trunk line of its harness, so that both shortening of the harness and the downward-offset arrangement of the stroke sensor 30 are attained.

Meanwhile, as shown in FIG. 7, the engaged groove 42a of the upper link arm 42 slidably engages with the engaging pin 19 provided on the side of the brake pedal 21 from below so that the engaging pin 19 can be slid vertically inside the engaged groove 42a. The engaged groove 42a is configured such that the engaging pin 19 is slid vertically along the engaged grove 42a by a specified length that is long enough to allow the falling-off of the brake pedal 21.

That is, as shown in FIG. 7, if a pedal-rotational-axis falling-off stroke where the pedal rotational axis 20 completely gets apart from the support portion 13d of the pedal brackets 12, 13 is represented by ST1, a stroke ST2 from a bottom portion of the engaging pin 19 engaged with the engaged groove 42a to a groove bottom portion of the engaged groove 42a is set to be equal to the above-described falling-off stroke ST1 or greater (ST2≥ST1), thereby attaining the smooth falling-off of the brake pedal 21 in the vehicle collision.

Further, the link arms 42, 43 are arranged to be offset leftward, in the vehicle width direction, relative to the stroke sensor 30 as shown in FIG. 9, the stroke sensor 30 is arranged to be spaced apart from a right-side end portion of the pedal rotational axis 20 as shown in FIG. 1, and the engaged groove 42a is arranged to extend downward to a position which overlaps an upper portion of the sensor housing 31 of the stoke sensor 30 in the side view as shown in FIG. 7 such that when the brake pedal 21 is made to fall off by the rotational lever 15 as the falling-off mechanism in the vehicle collision, the brake pedal 21, in particular the pedal rotational axis 20, does not interfere with the stroke sensor 30.

In other words, the groove length of the engaged groove 42a of the link arm 42, the offset arrangement of the link arm 42 relative to the stroke sensor 30, and the offset arrangement of the stroke sensor 30 relative to the end portion of the pedal rotational axis 20 configure the present embodiment such that the link arm 42 and the stroke sensor 30 do not block (prevent) the falling-off of the pedal brake 21 (particularly, the pedal rotational axis 20).

Further, the present embodiment is configured, as shown by the two-dotted broken line in FIG. 7, such that when the brake pedal 21 is depressed, the above-described engaged groove 42a slants relative to the pedal rotational axis 20 (such that its front is high and its rear is low), the link arm 42 is rotatable such that its front moves downward, and the falling-off of the brake pedal 21 is allowed by the downward rotation of the link arm 42 according to the depression of the brake pedal 21, thereby attaining the smoother falling-off of the brake pedal 21 in the vehicle collision. Moreover, the above-described pedal is the brake pedal 21, and the slant direction of the engaged groove 42a of the link arm 42 corresponds to the depressing direction of the brake pedal 21. Thereby, the present embodiment is configured such that when the brake pedal 21 falls off, an abnormal increase of the brake pedal stroke is detected by the stroke sensor 30, so that it is judged that the brake pedal 21 has fallen off. Herein, since the brake operation becomes impossible after the brake pedal 21 has fallen off, an electric parking brake, not illustrated, may be configured to operate in response to an output of the abnormal-stroke detection.

Figure 13:
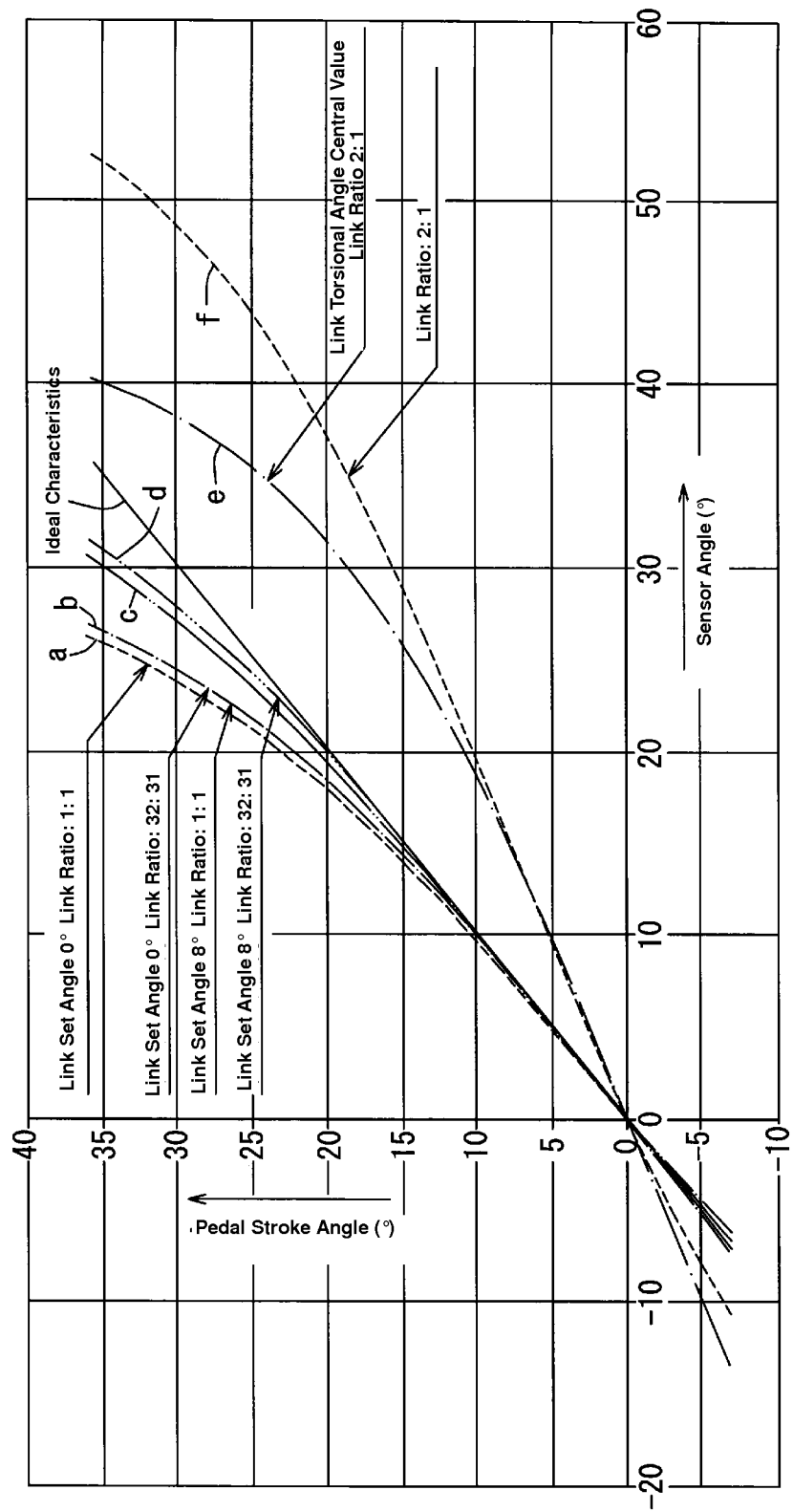
FIG. 13 is a characteristic diagram showing a change of a sensor angle relative to the pedal stroke angle.

FIG. 13 is a characteristic graph of the stroke-sensor characteristics, having the abscissa representing the sensor angle and the ordinate representing the pedal stroke angle, which has been measured by respectively changing the link ratio between the distance L1 and the distance L2 (L1:L2) shown in FIG. 8 and the angle θ1 (link set angle) relative to the line X (which passes the center of the pedal rotational axis 20 and the center of the link-arm rotational axis 41 in the state in which the peal is not depressed) shown in FIG. 8.

The characteristics a shows the one in which the link set angle θ1 is 0° and the link ratio L1:L2 is 1:1 (equal length).

The characteristics b shows the one in which the link set angle θ1 is 0° and the link ratio L1:L2 is 32:31 (i.e., 1:0.96875).

The characteristics c shows the one in which the link set angle θ1 is 8° and the link ratio L1:L2 is 1:1 (equal length).

The characteristics d shows the one in which the link set angle θ1 is 8° and the link ratio L1:L2 is 32:31 (i.e., 1:0.96875).

The characteristics e shows the one in which the link set angle θ1 is 0° and the link ratio L1:L2 is 2:1 (i.e., 1:0.5).

The characteristics f shows the one in which the link set angle θ1 is 8° and the link ratio L1:L2 is 2:1 (i.e., 1:0.5).

Herein, the characteristics b, d, e and f are the ones of the present embodiment, whereas the characteristics a and c are the ones of comparative examples. Since the ratio of the distance L2 relative to the distance L1 is extremely low in the characteristics e and f, it was found that the accuracy in the initial stage of the depressing of the brake pedal 21 is high, but the accuracy in the late stage of the depressing of the brake pedal 21 is low. Further, it was found that the characteristics b and d show better stroke sensor characteristics than the comparative-example characteristics, in particular, it was found that the characteristics d is the best mode that is the most similar to the ideal characteristics.

As described above, the pedal stroke sensor attachment structure of the automotive vehicle of the present embodiment comprises the pedal device 10 provided at the vehicle body positioned in front of the driver's seat, the pedal device 10 comprising the bracket (see the pedal brackets 12, 13) attached to the vehicle body, the hanging-type pedal (see the brake pedal 21) supported at the brackets 12, 13 via the pedal rotational axis 20, the falling-off mechanism (see the rotational lever 15) configured to make the pedal rotational axis 20 fall off the support portion 13d of the pedal rotational axis 20 when the collision load to make the pedal 21 retreat toward the passenger side is applied to the vehicle body, and the stroke sensor 30 provided at the bracket 13 to detect the depressing stroke of the pedal 21, and the link arms 42, 43 interlocking the stroke sensor 30 with the pedal 21, wherein the stroke sensor 30 is arranged to be offset downward relative to the pedal rotational axis 20, and the link arm 42 includes the engaged portion (see the engaged groove 42a), with which the engaging portion (see the engaging pin 19) provided on the side of the pedal 21 is slidably engaged, the engaged portion (the engaged groove 42a) of the link arm 42 being configured such that the engaging portion (the engaging pin 19) is slid vertically along the engaged portion (the engaged groove 42a) by the specified length that is long enough to allow the falling-off of the pedal rotational axis 20 performed by the falling-off mechanism (the rotational lever 15) (see FIGS. 3, 4 and 7).

According to the present pedal stroke sensor attachment structure, since the stroke sensor 30 is arranged to be offset downward relative to the pedal rotational axis 20, the design flexibility of the arrangement and attachment working space of the stroke sensor 30 can be improved. Further, since the engaged portion (the engaged groove 42a) is configured such that the engaging portion (the engaging pin 19) is slid vertically along the engaged portion (the engaging pin 19) by the specified length that is long enough to allow the falling-off of the pedal rotational axis 20 performed by the falling-off mechanism (the rotational lever 15), the smooth falling-off of the pedal 21 in the vehicle collision can be also attained.

Further, the link arms 42, 43 are arranged to be offset relative to the stroke sensor 30 in the vehicle width direction, the stroke sensor 30 is arranged to be spaced apart from the end portion of the pedal rotational axis 20 in the vehicle width direction, and the engaged groove 42a is configured to extend downward to the position where the engaged groove 42a overlaps the stroke sensor 30 in the side view (see FIGS. 5, 6, 7 and 9).

According to this structure, the pedal 21, in particular, its pedal rotational axis 20 does not interfere with the stoke sensor 30 when the pedal 21 is made to fall off by the falling-off mechanism in the vehicle collision. In other words, because of the above-described configuration of the engaged groove 42a of the link arm 42 for sliding the engaging pin 19 vertically along the engaged groove 42a by the specified length long enough to allow the falling-off of the pedal rotational axis 20, and the above-described offset arrangement of the link arms 42, 43 relative to the stroke sensor 30 and the above-described arrangement of the stroke sensor 30 being spaced apart from the end portion of the pedal rotational axis 20, the pedal's falling-off is not blocked by any of the link arms 42, 43 and the stroke sensor 30. Further, the pedal's falling-off can be attained more properly and surely, compared to a case in which the stroke sensor is directly connected to the stroke sensor by utilizing the link arm.

Further, the link arm 42 is configured such that the engaged groove 42a is inclined relative to the pedal rotational axis 20 and the link arm 42 is rotatable downward when the pedal 21 is depressed (see FIG. 7, in particular, the link arm 42 shown by the two-dotted broken line).

According to this structure, since the falling-off of the pedal 21 is allowed by the downward rotation of the link arm 42 in the pedal depressing, in addition to the downward-extension configuration of the engaged groove 42a, the smoother falling-off of the pedal 21 can be attained in the vehicle collision.

Moreover, the link arms 42, 43 include the link-arm rotational axis 41 which is coaxial with the stroke sensor 30 and is interlocked with the stroke sensor 30 so as to rotate synchronously with the stroke sensor 30, and the ratio of the distance L2 between the link-arm rotational axis 41 and the engaging portion (the engaging pin 19) relative to the distance L1 between the pedal rotational axis 20 and the engaging portion (the engaging pin 19) is set to be small than 1 (see FIGS. 4 and 8).

According to this structure, since the distance L2 between the link-arm rotational axis 41 and the engaging portion (the engaging pin 19) is shorter than the distance L1 between the pedal rotational axis 20 and the engaging portion (the engaging pin 19) (L2<L1), the rotation of the link arms 42, 43 increases when the link arm 42 rotates, following the pedal stroke. This action that the rotation of the link arms 42, 43 increases because of the above-described distance-ratio setting cancels (offsets) the action that the increase amount of the rotation of the link arms 42, 43 decreases which is derived from (caused by) the geometric characteristics (see FIG. 12) that the distance L2 between the link-arm rotational axis 41 and the engaging portion (the engaging pin 19) provided on the pedal side becomes longer as the pedal stroke increases. Consequently, the synchronization (synchronous rate) of the stroke sensor 30 synchronously rotating with the link arms 42, 43 and the rotation of the pedal 21 can be improved. Moreover, the synchronous-type stroke sensor 30 can be arranged to be offset relative to the pedal rotational axis 20, thereby improving the design flexibility. Thus, both the flexibility improvement of the offset arrangement of the stroke sensor 30 and the synchronization (synchronous rate) of the pedal 21 and the stroke sensor 30 can be attained.

Further, the position of the engaging portion (the engaging pin 19) in a state in which the pedal 21 is not depressed is located on the anti-rotational direction side of the pedal depression (see the link set angle θ1) within the range of the half of the pedal stroke or less relative to the line X which passes the pedal rotational axis 20 and the link-arm rotational axis 41 (see FIG. 8).

According to this structure, the above-described action that the rotation of the link arms 42, 43 increases because of the distance-ratio setting (L2<L1) becomes so large that the area where the above-described action that the increase amount of the rotation of the link arms 42, 43 decreases is small can be utilized widely, so that both the synchronization (synchronous rate) improvement and the increase-rate improvement can be attained.

Herein, the accuracy of the rotation detection in the initial stage of depressing where the frequency of use is high can be more improved preferentially in a case in which the above-described position of the engaging portion (the engaging pin 19) located on the anti-rotational direction side of the pedal depression (see the link set angle θ1) is much shorter than the pedal stroke.

Further, the position of the engaging portion (the engaging pin 19) is set to be located on the anti-rotational direction side of the pedal depression within the range of 35-45% of the pedal stroke (see FIG. 8).

According to this setting, the synchronization (synchronous rate) of the stroke sensor 30 in the whole actual pedal-stroke stage and the synchronization (synchronous rate) in the depressing initial stage can be balanced in the high level.

Also, the above-described ratio is set within 91.6-99% (see FIG. 8).

According to this setting, since the ratio of the distance L2 between the link-arm rotational axis 41 and the engaging portion (the engaging pin 19) relative to the distance L1 between the pedal rotational axis 20 and the engaging portion (the engaging pin 19) is set within 91.6-99%, the error can be suppressed to nearly 1% on the increase side in the first half of the pedal stroke, and also suppressed more than the case of the equal (the distance L2 between the link-arm rotational axis 41 and the engaging pin 19 is equal to the distance L1 between the pedal rotational axis 20 and the engaging pin 19) in the maximum pedal stroke (about 20°, for example).

Moreover, the distance L2 between the link-arm rotational axis 41 and the engaging portion (the engaging pin 19) is shorter than the distance L3 between the link-arm rotational axis 41 and the sensor connection portion 44 where the link-arm rotational axis 41 and the link arm 43 are connected to the stroke sensor 30, or the distance between the link-arm rotational axis 41 and the outline of the stroke sensor 30 near the sensor connection portion 44 (L2<L3) (see FIG. 8).

According to this structure, by utilizing the structure in which the link arms 42, 43 and the stroke sensor 30 are formed separately from each other, the distance L2 between the link-arm rotational axis 41 and the engaging portion (the engaging pin 19) can be set to be short regardless of the size of the stroke sensor 30, thereby making the increase ratio properly high.

Further, the stroke sensor 30 includes the connector 35 which is engaged therewith in the direction perpendicular to its axial direction, the position and the rotational range a of the sensor connection portion 44 to the lower link arm 43 is set to be within the specified range relative to the connector 35, and the link arms 42, 43 slant such that the angle β which is formed by the direction of the engaged portion (the engaged groove 42a) and the direction of the sensor connection portion 44 relative to the link-arm rotational axis 41 makes the connector 35 of the stroke sensor 30 look rearward through downward (see FIGS. 9 and 11A).

According to this structure, since the connector 35 of the stroke sensor 30 is made to look rearward through downward by the above-described angle setting, both the superior insertion performance of the connector 35 and the downward-offset arrangement of the stroke sensor 30 can be attained.

Also, the stroke sensor 30 includes the connector 35 which is engaged therewith in the direction perpendicular to its axial, the position and the rotational range a of the sensor connection portion 44 relative to the lower link arm 43 is set to be within the specified range, and the link arms 42, 43 slant such that the angle β formed by the direction of the engaged portion (the groove 42a) and the direction of the sensor connection portion 44 relative to the link-arm rotational axis 41 makes the connector 35 of the stroke sensor 30 look toward the trunk line of its harness (see FIGS. 9 and 11A)

According to this structure, since the connector 35 of the stroke sensor 30 is made to look toward the trunk line of its harness by the above-described angle setting, both shortening of the harness and the offset arrangement of the stroke sensor 30 can be attained.

Additionally, there is provided the sensor attaching bracket 36 which attaches the stroke sensor 30 to the pedal bracket 13, the link arms 42, 43 are pivotally supported at the pedal-side portion of the sensor attaching bracket 36, the stroke sensor 30 is attached to the anti-pedal side portion of the sensor attaching bracket 36 which is located oppositely to the pedal 21, and the detection terminal 33 (see the link engaging protrusion portion 34, in particular) which is pivotally supported at the stroke sensor 30 is engaged with the link arm 43 from the anti-pedal side.

According to this structure, attaching and detaching of the stoke sensor 30 for the sensor attaching bracket 36 is easy, so that the attachment flexibility and the serviceability of the stroke sensor 30 can be improved.

The pedal of the present invention corresponds to the brake pedal 21 of the above-described embodiment. Likewise, the bracket corresponds to the pedal brackets 12, 13, the falling-off mechanism corresponds to the rotational lever 15 and the contact member (not illustrated) provided on the instrument panel member, the engaged portion corresponds to the engaging pin 19, and the engaged portion corresponds to the engaged groove 42a.

The present invention should not be limited to the above-described embodiment, and any other modifications or improvements may be applied within the scope of a spirit of the present invention. For example, an accelerator pedal or clutch pedal may be used as the above-described pedal in place of the brake pedal.

What is claimed is:

1. A pedal stroke sensor attachment structure of an automotive vehicle, comprising:
a pedal device provided at a vehicle body positioned in front of a driver's seat, the pedal device comprising a bracket attached to the vehicle body, a hanging-type pedal supported at the bracket via a pedal rotational axis, a falling-off mechanism configured to make the pedal rotational axis fall off a support portion of the pedal rotational axis when a collision load to make the pedal retreat toward a passenger side is applied to the vehicle body, and a stroke sensor provided at the bracket to detect a depressing stroke of the pedal; and
a link arm interlocking the stroke sensor with the pedal, wherein said stroke sensor is offset downward relative to said pedal rotational axis, and said link arm includes an engaged portion, with which an engaging portion provided on a side of said pedal is slidably engaged, said engaged portion of the link arm being configured such that the engaging portion is slid vertically along the engaged portion by a specified length that is long enough to allow said falling-off of the pedal rotational axis performed by the falling-off mechanism.

2. The pedal stroke sensor attachment structure of the automotive vehicle of claim 1, wherein said link arm is offset relative to said stroke sensor in a vehicle width direction, the stroke sensor is spaced apart from an end portion of said pedal rotational axis in the vehicle width direction, and said engaged portion is configured to extend downward to a position where the engaged portion overlaps the stroke sensor in a side view.

3. The pedal stroke sensor attachment structure of the automotive vehicle of claim 2, wherein said link arm is configured such that said engaged portion is inclined relative to said pedal rotational axis and the link arm is rotatable downward when said pedal is depressed.

4. The pedal stroke sensor attachment structure of the automotive vehicle of claim 2, wherein said link arm includes a link-arm rotational axis which is coaxial with said stroke sensor and is interlocked with the stroke sensor so as to rotate synchronously with the stroke sensor, and a ratio of a distance between said link-arm rotational axis and said engaging portion relative to a distance between said pedal rotational axis and said engaging portion is set to be smaller than 1.

5. The pedal stroke sensor attachment structure of the automotive vehicle of claim 1, wherein said link arm includes a link-arm rotational axis which is coaxial with said stroke sensor and is interlocked with the stroke sensor so as to rotate synchronously with the stroke sensor, and a ratio of a distance between said link-arm rotational axis and said engaging portion relative to a distance between said pedal rotational axis and said engaging portion is set to be smaller than 1.

6. The pedal stroke sensor attachment structure of the automotive vehicle of claim 5, wherein a position of said engaging portion in a state in which said pedal is not depressed is located on an anti-rotational direction side of a pedal depression within a range of the half of a pedal stroke or less relative to a line passing said pedal rotational axis and said link-arm rotational axis.

7. The pedal stroke sensor attachment structure of the automotive vehicle of claim 6, wherein said position of the engaging portion is located on the anti-rotational direction side of the pedal depression within the range of 35-45% of the pedal stroke.

8. The pedal stroke sensor attachment structure of the automotive vehicle of claim 5, wherein said ratio is set within 91.6-99%.

9. The pedal stroke sensor attachment structure of the automotive vehicle of claim 5, wherein said distance between the link-arm rotational axis and the engaging portion is shorter than a distance between the link-arm rotational axis and a sensor connection portion where the link-arm rotational axis and said link arm are connected to said stroke sensor, or a distance between the link-arm rotational axis and an outline of the stroke sensor closest to said sensor connection portion.

10. The pedal stroke sensor attachment structure of the automotive vehicle of claim 5, wherein said stroke sensor includes a connector which is engaged therewith in a direction perpendicular to an axial direction thereof, a position and a rotational range of a sensor connection portion to said link arm is set to be within a specified range relative to said connector, and the link arm slants such that an angle which is formed by a direction of said engaged portion and a direction of said sensor connection portion relative to said link-arm rotational axis makes the connector of the stroke sensor look rearward through downward.

11. The pedal stroke sensor attachment structure of the automotive vehicle of claim 5, wherein there is provided a sensor attaching bracket which attaches said stroke sensor to said bracket, said link arm is pivotally supported at a pedal-side portion of said sensor attaching bracket, the stroke sensor is attached to a side of the sensor attaching bracket opposite the pedal-side portion of the sensor attaching bracket, and a detection terminal which is pivotally supported at the stroke sensor is engaged with the link arm from the side of the sensor attaching bracket opposite the pedal-side portion of the sensor attaching bracket.

* * * * *